J. H. WALLACE & T. D. & J. D. MEANS.
BEET HARVESTER.
APPLICATION FILED APR. 26, 1913.

1,105,728.

Patented Aug. 4, 1914.
3 SHEETS—SHEET 1.

J. H. WALLACE & T. D. & J. D. MEANS.
BEET HARVESTER.
APPLICATION FILED APR. 26, 1913.

1,105,728.

Patented Aug. 4, 1914.
3 SHEETS—SHEET 2.

Witnesses,

Inventors
Jacob H. Wallace.
Thomas D. Means.
John D. Means.

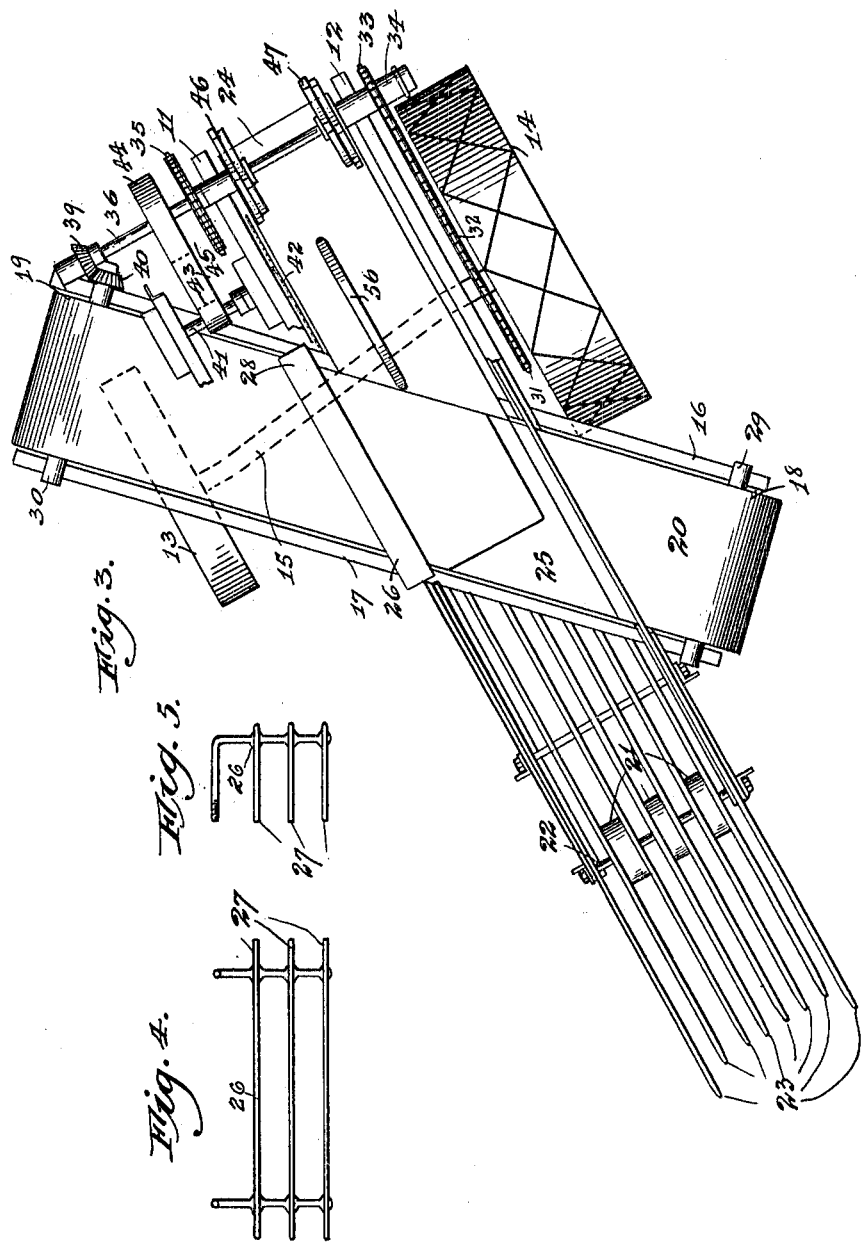

UNITED STATES PATENT OFFICE.

JACOB H. WALLACE, THOMAS D. MEANS, AND JOHN D. MEANS, OF BOULDER, COLORADO.

BEET-HARVESTER.

1,105,728.  Specification of Letters Patent.  Patented Aug. 4, 1914.

Application filed April 26, 1913. Serial No. 763,754.

*To all whom it may concern:*

Be it known that we, JACOB H. WALLACE, THOMAS D. MEANS, and JOHN D. MEANS, all of the town of Boulder, county of Boulder, and State of Colorado, have invented certain new and useful Improvements in Beet-Harvesters, of which the following is a specification.

Our invention relates to beet harvesters and the principal object thereof is to provide a machine which will plow the beets from the ground and convey them in fixed position to a cutting mechanism whereby the beet tops are severed from the beet bodies and conveyed in different directions to suitable receptacles wherein they are separately deposited.

The novelty of the invention resides primarily in the two conveying means and in the combination of the two conveying means with cutting mechanism whereby the beets are placed in such a position relative to the cutting mechanism that the beet tops will be severed accurately and uniformly immediately adjacent the body of the beet.

Further advantages of the invention reside in specific details of construction hereinafter more particularly referred to in the specification and pointed out in the claims.

Figure 1:
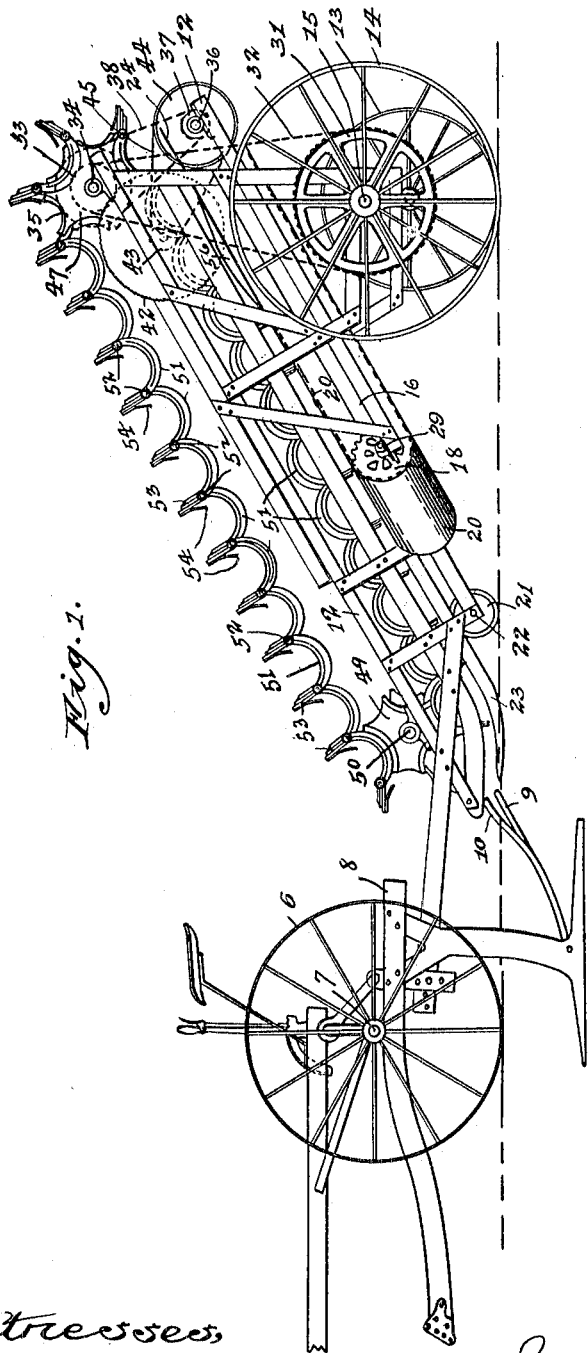
Figure 2:
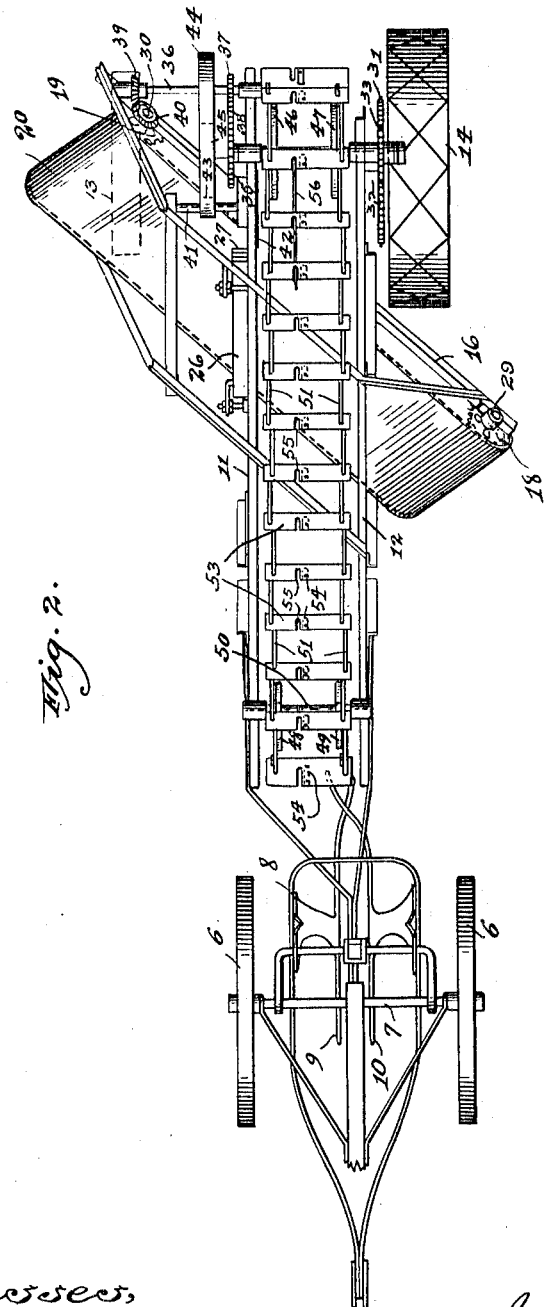

Referring now more particularly to the drawings, Figure 1 is a side elevational view of our improved beet harvester; Fig. 2 is a top plan view of Fig. 1; Fig. 3 is a similar view to Fig. 2 with the beet plow and one of the beet conveying means removed. Fig. 4 is a side elevational view of the grid bar for stopping the beets; Fig. 5 is an end view of Fig. 4.

Referring now more particularly to the drawing the plow consists of a pair of wheels 6 mounted upon the axle 7 to which axle a frame 8 is connected carrying the plow points 9 and 10. The plow points 9 and 10 are spaced apart at their forward ends, but the distance between them is less than the greatest diameter of the average beet. The plow points extend rearwardly and upwardly in substantially parallel alinement for the greater portion of their length and at their rear ends converge inwardly with one of the plow points 10 overlying the rear end of the plow point 9 but separated therefrom. The plow points are of sufficient length so that the rear ends thereof extend slightly above the ground, while the forward ends project into the ground a sufficient distance to engage the beets. As the plow is pulled along the beet row, the beets pass between the plow points 9 and 10 and are pushed therealong by the succeeding beets. As the beet approaches the rear end of the plow points it is turned upon its side by reason of the plow point 10 overlying the plow point 9 and is deposited upon the main portion of the harvesting machine as will now be described. The main portion of the harvesting machine consists of the side frames 11 and 12 which are upwardly and rearwardly inclined, being supported at their rear end by the wheels 13 and 14 mounted upon the axle 15 which is secured to the two side-frame members.

A supplementary conveyer frame consisting of side members 16 and 17 crosses the main conveyer frame and at each end of the supplementary frame the drums 18 and 19 are mounted upon suitable axles and an endless conveyer 20 extends around said drums. The conveyer 20 may be of any suitable material. The forward end of the main frame is supported by the rollers 21 mounted upon the axle 22 that is secured between the side frames 11 and 12. A plurality of space bars 23 extend from the forward end of the main frame to the side bar 17 of the supplementary frame and the top surfaces of the bars 23 lie in substantially the same plane as the top surface of the conveyer 20. The rear end of the main frame is decked over, the upper surface of the deck 24 lying in substantially the same plane as the upper surface of the conveyer 20 and there is a partial deck 25 overlying the conveyer 20 the top surface of which also lies in substantially the same plane with the top surfaces of the bars 23.

A stop member 26, herein shown as comprising a series of grid bars 27 extends across the conveyer 20, but is arranged parallel to the side bar 11 of the main frame and one end 28 of the stop mechanism extends slightly beyond one side of the conveyer 20. The drums 18 and 19 are mounted upon the axles 29 and 30, respectively, the axle 30 being driven from a sprocket wheel 31 that is mounted upon the axle 15. A chain 32 extends from the sprocket 31 to the sprocket 33 which is fixed upon the shaft 34 that is mounted upon the main frame 11 and 12. The shaft 34 is provided with a sprocket 35 at its other end. The shaft 36 is mounted between the side member 11 of the main frame and the side member 16 of the supplemental frame and is provided with a sprocket 37 which is connected to the sprocket 35 by the chain 38. A bevel gear 39 is mounted on the shaft 36 which meshes with the bevel gear 40 on the shaft 30 so that when the axle 15 rotates the shaft 30 will be driven thereby driving the endless conveyer 20. The shaft 41 which is suitably mounted upon the main frame carries a cutting disk or saw 42 at one end, which saw lies immediately adjacent one side of the deck 24 and the periphery of which extends between the edge of the deck 24 and the inner edge of the stop member 26.

Belt wheels 43 and 44 are mounted upon the shafts 41 and 36, respectively, which are coupled by a belt 45 whereby the saw 42 rotates upon the rotation of the main axle 15. Sprocket wheels 46 and 47 are mounted upon the shaft 34 and similarly shaped sprocket wheels 48 and 49 are mounted on a shaft 50 that is supported by the frame members 11 and 12. These sprocket wheels are for the purpose of driving an endless carrier which will now be described.

The endless carrier consists of a plurality of crescent shaped links 51 which are pivoted together by the pivot pins 52, thereby forming a pair of chains, one upon each side of the main frame, one chain passing around the sprockets 46 and 48 and the other chain around the sprockets 47 and 49, which sprockets are so formed as to enter between the links to effect the driving of the chains.

Conveying blades 53 are mounted between the chains and each blade is provided with a spring finger 54, the function of which will hereafter be described. Each blade is also formed with a slot 55 to pass over the wedge-shaped block 56 upon the deck 24.

It will be readily understood from the drawings that as the beet conveyer is drawn forward by any suitable means the movement of the chain is such as to carry the beets that pass from the plow points upon the bars 23 upwardly along said bars across the conveyer 20 and deck 24 and off of the rear end of the deck 24 into any suitable receptacle.

Having now described the parts of our machine the operation thereof and the function of the various parts is as follows: In harvesting beets, after the beets are removed from the ground it is customary to sever the beet tops from the body of the beets as each part has its particular value and we are aware that there have been numerous machines designed to accomplish broadly this result, but the machines with which we are familiar are not capable of working rapidly, not cutting the beet tops accurately from the beet bodies. The peculiar shape of the beet makes it difficult to deliver each beet to the cutting mechanism rapidly and in such position that the beet tops will be severed closely from the beet bodies, which results we accomplish in the following manner: As the beet harvester is moved along a row of beets the plow points 9 and 10 pass upon opposite sides of each beet, whereupon the beet is pulled from the ground by reason of the inclined plow points and each beet is moved rearwardly of the plow points by the succeeding beet. As a beet reaches the rear end of the plow points it is tipped upon its side and deposited upon the bars 23 and the tops of each beet therefore lie toward the side frame 11. As long as the beet harvester is in motion the endless conveyer formed by the chains 51 and blades 53 is in operation, so that as the beets are deposited upon the bars 23 the conveyer moves them upwardly along said bars, which bars are separated for the purpose of letting the loose earth pass free of the harvester. The beet tops grow from the larger end of the beet which, as before stated, lies toward the side bar 11 and, therefore, the blades 53 would swing the beets until the side of the beet would lie parallel to the blades if it were not for the fingers 54 projecting from each blade, which project forwardly enough to engage the beet so as to hold it in a position where its long axis is substantially at right angles to the longitudinal axis of the main frame, or parallel with the blade, whereupon the beet travels along the bars 23 and over the deck 25 in this position until it is deposited upon the conveyer 20. The motion of the conveyer is to carry the beets toward the stop member 27, the grid construction of the stop member permitting the tops of the beets to pass therethrough, but the larger end of the beets being too large to pass between the grid bars are thereby carried by the blades 53 toward the cutting device.

It is of course desirable to cut the tops from the beet body with as little of the beet body upon the tops, or as little of the tops upon the beet body as possible and to accomplish this result we have devised means whereby the beet is tipped and held in a position relative to the cutting device so that the beet tops will be cut off at substantially a right angle to the longitudinal axis of the beet which is accomplished by the beets striking the wedge-shaped block 56, whereupon the small or tapered end of the beet rides upon the block 56, thereby bringing the beet body and beet tops into a position for an accurate separation by the cutting device. When the parts are so severed the beet tops are carried beyond the stop member 26 by the conveyer 20 and are deposited in a suitable container that may be positioned at the discharge end of the conveyer, not herein shown. The beet bodies are carried over the deck 24 by the main conveyer and deposited in a receptacle at the rear end of the harvester, which receptacle is not shown. As the cutting device engages the beet tops it will be evident that the beet is, at the same time, held by one of the blades 53, the finger 54 thereon and the wedge-block 56.

We deem it necessary that the rate of travel of the conveyer 20 shall be great enough to have a component rate of travel in the direction of the main conveyer substantially equal to the rate of travel of the main conveyer, or otherwise the beet leaves would not be pulled axially away from the beet body during the topping operation.

The machine herein shown represents the preferred embodiment of our device, but it is obvious that many minor details of construction might be changed without departing from the broad general principle of operation, and, therefore, without confining ourselves to such minor details of construction.

We claim:

1. In a beet harvester, a beet digging device, an endless carrier, means for depositing the beets upon said endless carrier in a uniform position, means for drawing the beets to one side of said endless carrier, means on one side of said endless carrier for stopping the beets and a cutting member adjacent the endless carrier for severing the tops of the beets from the beet bodies, whereby the beet tops are carried in one direction and the beet bodies in another.

2. In a beet harvester, a beet digging device, an endless carrier, means for depositing the beets upon said endless carrier in a uniform position, a carrier crossing the path of said endless carrier, beet stopping means at one side of said endless carrier and a cutting member between said beet stopping means and said endless carrier for severing the tops of the beets from the beet bodies whereby the beet tops are carried in one direction and the beet bodies in another direction.

3. In a beet harvester, a beet digging device, an endless carrier, means for depositing the beets on said endless carrier in a uniform position, means for drawing the beets to one side of said endless carrier, means at one side of said endless carrier for stopping the beets, a cutting member adjacent the endless carrier for severing the tops of the beets from the beet bodies and means adjacent said cutting member for tipping the beets into position to receive the cutting member, whereby the beet tops are severed from the beet bodies at substantially a right angle to the longitudinal axis of the beet.

4. In a beet harvester, a beet digging device, an endless carrier, means for depositing the beets on said endless carrier in a uniform position, means for drawing the beets to one side of said endless carrier, a grid stop member at one side of said endless carrier, a cutting member adjacent the endless carrier for severing the tops of the beets from the beet bodies and means adjacent said cutting member for tipping the beets into position to receive the cutting member, whereby the beet tops are severed from the beet bodies at substantially a right angle to the longitudinal axis of the beet.

5. In a beet harvester, a beet digging device, an endless carrier, comprising a plurality of blades secured to side members, a spring finger upon each of said blades, means for depositing the beets in the path of said blades in a uniform position, a supplementary carrier crossing the path of said endless carrier, a grid beet stop-member at one side of said endless carrier, a cutting member between said beet stopping member and said endless carrier and a tipping device in the path of said endless carrier and adjacent said cutting member whereby the beets are brought into operative position to receive the cutting member and the severed beet tops are carried in one direction and the beet bodies in another direction.

6. In a beet harvester a beet digging device, a main endless carrier, means for depositing the beets in the path of said main-endless carrier in a uniform position, a supplementary endless carrier arranged at an angle to the path of travel of said main carrier and moving at less speed than said main carrier, means at one side of said main carrier for stopping the beets while upon said supplementary carrier, means for severing the beet tops from the beet bodies while the beets remain upon said supplementary carrier whereby the beet tops are carried in one direction and the beet bodies in another.

JACOB H. WALLACE.
THOMAS D. MEANS.
JOHN D. MEANS.

Witnesses:
J. E. De Kalb,
Jno. Mossman.